United States Patent
Fridman et al.

(10) Patent No.: US 7,829,051 B2
(45) Date of Patent: Nov. 9, 2010

(54) PRODUCTION AND USES OF CARBON SUBOXIDES

(75) Inventors: Alexander Fridman, Marlton, NJ (US);
Alexander F. Gutsol, Malvern, PA (US);
Young L. Cho, Marlton, NJ (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 12/495,277

(22) Filed: Jun. 30, 2009

(65) Prior Publication Data
US 2009/0305091 A1 Dec. 10, 2009

Related U.S. Application Data

(63) Continuation of application No. 11/677,187, filed on Feb. 21, 2007, now Pat. No. 7,569,203.

(60) Provisional application No. 60/775,176, filed on Feb. 21, 2006.

(51) Int. Cl.
*C01B 31/00* (2006.01)
(52) U.S. Cl. .............. 423/415.1; 423/648.1; 423/437.1; 977/742; 562/470
(58) Field of Classification Search .............. 423/415.1, 423/648.1, 437.1; 977/742; 562/470
See application file for complete search history.

(56) References Cited

OTHER PUBLICATIONS

Ballauff, M., et al., "Analysis of Poly(Carbon Suboxide) by Small-Angle X-Ray Scattering", Angew. Chem. Intl. Ed., 2004, vol. 43, 5843-5846.

Baranov, I.E., et al., "Breakaway Oxidation Effect and It's Influence on Severe Accident", I.V. Kurchatov Institute of Atomic Energy, Moscow, 1991.

Bellamy, P.H., et al., "Carbon Losses From All Soils Across England and Wales 1978-2003", Nature, 2005, vol. 437, 245-248.

D'Amico, K.M., et al., "Mechanism and Rate of Loss of CO in Glow Discharges in CO, CO-HE and CO-N2-He", J. Phys. D. Appl. Phys., 1997, vol. 10, 261-267.

Dillon, A.C., et al., "Hydrogen Storage in Carbon Single-Wall Nanotubes", Proceedings of the 2002 U.S. DOE Hydrogen Program Review, 2002, NREL/CP-610, 32405.

Forest Product Fact Sheet, "Low Temperature Plasma Technologies for Treating Emissions from Pulp Mills and Wood Products", Office of Industrial Technologies, Alexander Fridman and John Harkness.

Kalra, C.S., et al., "Gliding Arc Discharges as a Source of Intermediate Plasma for Methane Partial Oxidation", IEEE Transactions of Plasma Science, 2005, vol. 33, No. 1, 32-41.

Schulze, E.D., et al., "Carbon Unlocked From Soils", Nature, 2005, vol. 437, 205-206.

*Primary Examiner*—Timothy C Vanoy
*Assistant Examiner*—Michelle Hou
(74) *Attorney, Agent, or Firm*—Woodcock Washburn, LLP

(57) ABSTRACT

Methods for the reduction of gaseous carbon dioxide emissions from combustion or oxidation reactions are provided. The various methods involve the formation of carbon suboxides and/or polymerized carbon suboxides (PCS), preferentially over gaseous carbon oxides to thereby reduce gaseous carbon dioxide emissions. The various methods can be employed for efficient generation of energy and/or hydrogen. In addition, various methods for the use of polymerized carbon suboxide are disclosed.

34 Claims, No Drawings

PRODUCTION AND USES OF CARBON SUBOXIDES

CROSS REFERENCE TO RELATED APPLICATION

This application is a continuation of U.S. application Ser. No. 11/677,187, filed on Feb. 21, 2007 now U.S. Pat. No. 7,569,203, published Aug. 23, 2007 as U.S. Publication No. US 2007/0196261 A1, which claims the benefit of U.S. application Ser. No. 60/775,176, filed Feb. 21, 2006, the entireties of which are all incorporated herein by reference.

BACKGROUND OF THE INVENTION

A. Field of the Invention

The present invention relates to methods of reducing emissions of gaseous carbon oxides from the combustion and/or oxidation of hydrocarbons. More specifically, the present invention relates to methods for the preferential production of carbon suboxides from the combustion and/or oxidation of hydrocarbons and to uses for the produced carbon suboxides.

B. Description of the Prior Art

When hydrocarbons, such as oil, gasoline, coal and other fossil fuels, as well as renewable hydrocarbon sources such as wood, are oxidized to produce energy, a variety of different carbon-containing products are formed. The two most common carbon-containing products are carbon monoxide, CO, and carbon dioxide, $CO_2$. In addition, some combustion and/or oxidation processes may form carbon suboxide, $C_3O_2$.

Carbon monoxide is produced, for example, when graphite (one of the naturally occurring forms of elemental carbon) is heated or burned in the presence of a limited amount of oxygen. The reaction of steam with red-hot coke also produces carbon monoxide along with hydrogen gas ($H_2$). Coke is the impure carbon residue resulting from the burning of coal. This mixture of CO and $H_2$ is called water gas or syn-gas and is used as an industrial fuel or feedstock for organic synthesis. In the laboratory, carbon monoxide is prepared by heating formic acid, HCOOH, or oxalic acid, $H_2C_2O_4$, with concentrated sulfuric acid, $H_2SO_4$. The sulfuric acid removes and absorbs water ($H_2O$) from the formic or oxalic acid. Because carbon monoxide burns readily in oxygen to produce carbon dioxide, as exemplified in the following reaction, $$2CO+O_2 \rightarrow 2CO_2,$$

carbon monoxide is useful as a gaseous fuel. Carbon monoxide is also useful as a metallurgical reducing agent because at high temperatures it reduces many metal oxides to the corresponding elemental metal. For example, copper (II) oxide, CuO, and iron (III) oxide, $Fe_2O_3$, can be reduced to the corresponding metals by carbon monoxide.

Carbon monoxide is an extremely dangerous poison as it is an odorless and tasteless gas, giving no warning of its presence. Carbon monoxide has an affinity for hemoglobin that is two hundred times greater than that of oxygen. Thus, carbon monoxide readily replaces oxygen and binds to the hemoglobin in blood to form carboxyhemoglobin that is so stable that it cannot be broken down by body processes. The ability of red cells to carry oxygen is destroyed by exposure to carbon monoxide, and suffocation may occur.

Carbon dioxide is produced when any form of carbon or almost any carbon compound is burned in the presence of an excess of oxygen. Many metal carbonates also liberate $CO_2$ when they are heated. For example, calcium carbonate ($CaCO_3$) produces carbon dioxide and calcium oxide (CaO).

$$CaCO_3 + heat \rightarrow CO_2 + CaO$$

The fermentation of glucose during the preparation of ethanol produces large quantities of $CO_2$ as a by-product. The same process also makes breads rise.

$$C_6H_{12}O_6 \rightarrow 2C_2H_5OH + 2CO_2$$

In the laboratory $CO_2$ can be prepared by adding a metal carbonate to an aqueous acid; as illustrated in the following reaction.

$$CaCO_3 + 2H_3O^+ \rightarrow Ca^{2+} + 3H_2O + CO_2$$

The Earth's atmosphere contains approximately 0.04 percent carbon dioxide by volume and serves as a huge reservoir of this compound. The carbon dioxide content of the atmosphere has significantly increased in the last several years largely because of the burning of fossil fuels. A so-called greenhouse effect results from increased carbon dioxide and water vapor in the atmosphere. These gases allow visible light from the sun to penetrate to the Earth's surface, where it is absorbed and reradiated as infrared radiation. This longer-wavelength radiation is absorbed by the carbon dioxide and water and cannot escape back into space. There is increasing concern that the resulting increased heat in the atmosphere could cause the Earth's average temperature to increase 2° to 3° C. over a period of time. This change would have a serious impact on the environment, affecting climate, ocean levels, and agriculture.

Carbon suboxide, $C_3O_2$, is a foul-smelling, lachrymatory gas that can be produced by the dehydration of malonic acid, $CH_2(COOH)_2$, with $P_4O_{10}$ in a vacuum at 140° to 150° C. Carbon suboxide is a linear, symmetrical molecule whose structure can be represented as O=C=C=C=O. At 25° C. the compound is unstable and polymerizes to highly-colored solid products, but it is a stable molecule at −78° C. Polymerized carbon suboxide (PCS) is generally considered to be a substance with variable composition as the carbon to oxygen ratio in the PCS is not constant.

Under the influence of ultraviolet light (in the process known as photolysis), $C_3O_2$ decomposes to the very reactive molecule ketene, $C_2O$. Since carbon suboxide is the acid anhydride of malonic acid, it reacts slowly with water to produce malonic acid.

A method to use only the hydrogen component from all hydrocarbon fuels and keep carbon as a solid waste or raw material was proposed by Meyer Steinberg from Brookhaven National Laboratory [M. Steinberg, "Decarbonization and Sequestration for Mitigating Global Warming", International Symposium "Deep See & $CO_2$ 2000", Feb. 1-2, 2000 at SR1, Mitaka, Tokyo, p. 4-2-1-4-2-6 (http://www.nmri.go.jp/co2/4-2.pdf)]. The major drawback of this method is that only a small portion of the available hydrocarbon chemical energy is actually utilized. For example, in the best scenario for this method, only about a half of the available energy from the reactions in equations (1) and (2) is actually released and utilized $$CH_4 \rightarrow C + 2H_2 \tag{1}$$

$$2H_2 + O_2 \rightarrow 2H_2O \tag{2}$$

as compared to the energy produced from a complete methane oxidation, shown in equation (3).

$$CH_4 + 2O_2 \rightarrow CO_2 + 2H_2O \tag{3}$$

Suboxide polymers have chemically and thermodynamically stable structures similar to humic acids, the organic component of most fertile soils, and can be used as a soil conditioner. Use of biomass as fuel is a commonly accepted way to reduce net carbon emissions, however, recent sources indicate that agricultural land use may release carbon stored in soil, effectively counteracting advantages of biomass-derived fuel. Recycling of suboxide polymer to agricultural soils can mitigate carbon losses in soil due to agriculture as well as capture the economic advantage of carbon sequestration (currently over $80 per ton of carbon).

Due to the potential environmental impact of carbon dioxide emissions, there remains a need to reduce the carbon dioxide emissions while increasing the use of energy released from hydrocarbon fuels. Production of different carbon products in the form of a solid would reduce carbon oxide production thus reducing atmospheric pollution as well as slowing if not stopping the effects of greenhouse gases on the earth.

SUMMARY OF THE INVENTION

In a first aspect of the invention, carbon dioxide is converted to carbon suboxide polymers.

In another aspect of the invention, hydrogen is released from a hydrocarbon source while at the same time, reducing the production of gaseous carbon oxides by the preferential production of polymerized carbon suboxides.

In another aspect of the invention, solid polymerized carbon suboxide is a major product of a hydrocarbon combustion and/or oxidation process.

Other aspects of the present invention relate to uses of carbon suboxides as a fertilizer, a construction material, for the production of carbon fibers, and as surface coatings.

Further aspects and objects of the invention will be apparent from the detailed description of the preferred embodiments which follow.

DETAILS DESCRIPTION OF THE PREFERRED EMBODIMENTS

Carbon suboxide is a relatively low chemical energy product. When a hydrocarbon such as methane is oxidized to produce carbon suboxide as a polymerized or condensed reaction product, it is possible to utilize about 90% of the total available chemical energy of methane. Equation 4 exemplifies this reaction.

$$2CH_4 + 3O_2 \rightarrow (1/n)(C_3O_2)_n + 2H_2O \quad (4)$$

Alternatively, about 70% of the total available chemical energy of coal (graphite) may be utilized as exemplified by equation 5.

$$2C + 3O_2 \rightarrow (1/n)(C_3O_2)_n \quad (5)$$

Equation 6 exemplifies the complete oxidation of carbon.

$$C + O_2 \rightarrow CO_2 \quad (6)$$

The energy difference between the reactions (3) and (4), as well as the energy difference between the reactions (5) and (6), is relatively small, despite the low oxidation level of carbon in the products of reactions (4) and (5). This is due to the reaction product, polymerized carbon suboxide, (PCS), existing in the condensed phase, versus carbon dioxide which exists in the gaseous phase. Thus, the energy of the chemical bonds in PCS is relatively large. Similarly, the energy of the chemical bonds of the carbon atoms found in coal or different forms of carbon, such as graphite or diamond, is also large Hence, the production of $CO_2$ as a gaseous product requires a very high energy input that effectively reduces the net amount of energy available from complete oxidation reactions.

Therefore, a relative large amount of energy can be obtained from reactions (4) and (5) by producing condensed carbon suboxide $(C_3O_2)_n$ instead of a gaseous product, such as $CO_2$. The main benefit of forming a condensed carbon product would be a significant reduction in $CO_2$ production, without sacrificing combustion efficiency.

In one aspect of the invention, carbon suboxide and/or PCS is produced in a combustion or oxidation reaction to reduce emissions of gaseous carbon oxides. This aspect of the invention can also be employed to increase the efficiency of hydrocarbon use for energy and/or hydrogen production. The greater the efficiency of hydrogen production from hydrocarbon sources, the greater the amount of net energy that is available for the production of electricity from any given amount of hydrocarbon fuel using, for example, fuel cell technology. Carbon oxide sequestration utilizes carbon oxides in chemical processes with hydrocarbon participation to produce polymerized carbon suboxides as shown in the following equations (7) and (8), starting from, for example, methane and coal.

$$2CH_4 + CO_2 \rightarrow (1/n)(C_3O_2)_n + 4H_2 \quad (7)$$

$$2C + CO_2 \rightarrow (1/n)(C_3O_2)_n \quad (8)$$

Electricity and/or hydrogen can be simultaneously produced without gaseous carbon oxide production, by controlling the reaction conditions in a manner that allows the reactions (4) and (5), as well as the reactions (9) and (10) to proceed to the right (or product side) of the reaction.

$$3C + 2H_2O \rightarrow (1/n)(C_3O_2)_n + 2H_2 \quad (9)$$

$$3CH_4 + 2H_2O \rightarrow (1/n)(C_3O_2)_n + 8H_2 \quad (10)$$

Carrying out the reactions (4), (5), (9) and (10) under high heat and/or high pressure, optionally combined with the removal of one or more of the oxidation products, can provide PCS production and increased energy efficiency.

Currently, PCS is not a major product of hydrocarbon combustion. By utilizing a non-equilibrium process leading to PCS production, the production of PCS may be increased, for example, by constant removal of PCS from the reaction mixture. Alternatively, the reaction (9) can be caused to go substantially to completion by selectively removing hydrogen from the reaction mixture. Thus, for example, coal can be exposed to high temperature water or steam and the gaseous hydrogen product can be selectively removed from the reaction mixture to increase PCS production from this reaction. Optionally, other reaction conditions can be controlled to favor the desired reaction over other competing reactions that may occur in the reactor. For example, temperature, pressure, quantity of reactants, ratios of reactants, etc. can be controlled to favor the desired reaction, as discussed below.

Hydrogen can be selectively removed using membranes transparent for hydrogen (palladium or nickel) or high temperature membranes with high oxygen conductivity. For example, U.S. Pat. No. 6,048,472, cites C. Y. Tsai et al. as describing a non-isothermal, two-dimensional computational model of a mixed conducting membrane reactor using a perovskite membrane for the partial oxidation of methane to synthesis gas. This work was presented in related publications entitled "Simulation of a Non-isothermal Catalytic Membrane Reactor for Methane Partial Oxidation to Syngas" in the Proceedings of the Third International Conference on Inorganic Membranes, Worcester Mass., Jul. 10-14, 1994, and "Modeling and Simulation of a Non-isothermal Catalytic Membrane Reactor" in Chem. Eng. Comm., 1995, Vol. 134, pp. 107-132. Additional discussion of experimental and computational work on topics in these two publications was presented in the doctoral thesis by C. Y. Tsai entitled "Perovskite Dense Membrane Reactors for the Partial Oxidation of Methane to Synthesis Gas", May 1996, Worcester Polytechnic Institute (available through UMI Dissertation Services).

U.S. Pat. No. 6,048,472 also describes numerous reactors and compositions of mixed conducting membranes suitable for the production of synthetic gases from methane. Membrane reactors and methods of operating such reactors for the selective oxidation of hydrocarbons are also disclosed in related U.S. Pat. Nos. 5,306,411 and 5,591,315. Ceramic membranes with wide ranges of compositions are described which promote the transfer of oxygen from an oxygen-containing gas, as well as the reaction of the transferred oxygen with a methane-containing gas to form synthesis gas. Mixed conductors having a perovskite structure are utilized for the membrane material; alternatively multiphase solids are used as dual conductors wherein one phase conducts oxygen ions and another conducts electronic species. A membrane reactor to produce synthesis gas is disclosed which operates at a temperature in the range of 1000 to 1400° C., wherein the reactor may be heated to the desired temperature and the temperature maintained during reaction by external heating and/or exothermic heat from the chemical reactions which occur. Any membranes suitable for selective ion/gas removal may be utilized to remove hydrogen from the reaction mixture of the present invention.

In another aspect of the invention, a membrane with ion conductivity is used to produce electricity using fuel cell technology, Fuel cells are electrochemical devices that convert the chemical energy of fuel and an oxidant, such as air, directly to electrical energy and heat energy. A fuel cell consists of two electrodes, an anode and a cathode, with an electrolyte layer between them. Fuel, such as hydrogen, hydrocarbons or carbon monoxide, is continually fed to the anode and oxidized there to release electrons to an external circuit. An oxidant, such as air, is continually fed to the cathode and reduced there, accepting electrons from the anode through the external circuit. The electrolyte is a gas-tight, pure ionic conductive membrane through which only reactive ions can be transmitted. Such fuel cells have high energy conversion efficiency, since the fuel cell generates electrical energy from chemical energy directly, without any intermediate thermal and/or mechanical energy conversion steps. Generally a series of such cells may be operated together in a stack to provide a higher voltage. In such an arrangement, an interconnector connects the anode of one cell in stack to the cathode of the next cell in the stack. For example, according to the equation (9) the chemical reaction between carbon and water produces hydrogen gas, The hydrogen gas is fed to one side (anode) of the membrane (such as the perovskite membrane in solid oxide fuel cells), whereas oxygen is fed to the other side (cathode) of the membrane supplied from the outside. At the anode side the membrane converts the hydrogen gas into positively charged hydrogen ions. At a high temperature of 800° C. or greater, the oxygen gas at the cathode transforms to ionized oxygen atoms (oxygen ions), which travel to the anode and are combined with hydrogen ion for the production of electricity and water. Thus, electricity is produced by this reaction between carbon and oxygen. Water is an intermediate product and is reused in the chemical reaction with carbon at the anode side for the continuous production of hydrogen. As a byproduct of the electricity, polymerized carbon suboxide is produced at the anode, which is optionally continuously removed from the system. Optionally, other reaction conditions can be controlled to favor the desired reaction over other competing reactions that may occur in the reactor. For example, temperature, pressure, quantity of reactants, ratios of reactants, etc. can be controlled to favor the desired reaction, as discussed below.

In still another aspect of the invention, the foregoing methods can be operated in manner which promotes PCS production by removing PCS, for example, as a melted liquid. This is similar to the concept of liquid iron removal in blast furnace process. In this aspect of the invention, PCS can be the only product removed from the reaction mixture, or, another product of the reaction, such as hydrogen, can also be removed from the reaction mixture, in addition to the removal of PCS. Optionally, other reaction conditions can be controlled to favor PCS production over other competing reactions that may occur in the reactor. For example, temperature, pressure, quantity of reactants, ratios of reactants, etc. can be controlled to favor PCS production.

In another aspect of the invention, a novel method for the physical separation of carbon suboxide or its polymers is employed, optionally to remove PCS from the reaction mixture. The selective removal of carbon suboxide or its polymers takes advantage of the difference in density among CO, $CO_2$, water vapor, carbon and carbon suboxide and its polymers. In a vertical reactor, the chemical reaction between hydrocarbon and water vapor results in polymerized carbon suboxide, which is in a condensed form. Thus, in a vertical reactor, the polymerized carbon suboxide is deposited at the bottom of the reactor because it is denser than other products formed in the reactor, whereas gaseous matter, such as hydrogen and gaseous carbon oxides, will rise to the top of the reactor. Water vapor typically remains in the middle of the reactor, and carbon particles are generally found between the water vapor and the carbon suboxide. Thus, each species finds its place in a vertical reactor due to density differences. Hence, each species can be physically separated and removed from the reactor by providing an exit stream at the appropriate location in the reactor. For example, the polymerized carbon suboxide can be removed from the bottom of the reactor via an exit stream provided at or near the bottom of the reactor, by gravity or by a suction means.

In another aspect of the invention, a water stream or a water spray is utilized to remove carbon suboxide. In another aspect, a slowly moving water stream or spray may be utilized where a mixture of hydrogen gas, water vapor, and carbon suboxide makes contact with water. The carbon suboxide is collected in water, forming an aqueous medium to be discarded In another aspect of the invention, a novel method for surface coating using a carbon suboxide layer is disclosed. Under fuel rich conditions (i.e., more fuel and less oxygen) in a combustion process, soot is often produced as a combustion product. At an equivalence ratio of 6 equivalents of fuel to one equivalent of oxygen or greater, soot from the combustion exhaust gas is readily deposited on a surface. In a partial oxidation process utilizing a gliding arc system at an equivalent ratio of approximately 4 equivalents of fuel to one equivalent of oxygen, carbon suboxide is produced as a byproduct. Thus, it is preferred to use an equivalent ratio of more than 2 equivalents of fuel, e.g. carbon, to one equivalent of oxygen, more preferably, at least 3 equivalents of fuel, e.g. carbon, to one equivalent of oxygen, and, most preferably, at least 3.5 equivalents of fuel, e.g. carbon, to one equivalent of oxygen. Applying an arc discharge to the CO by-product gold colored deposits of carbon suboxide are produced. Thus, carbon suboxide and PCS layers may be produced by arc discharge. A thin uniform layer of either carbon suboxide or PCS can readily be created on any surface including, but not limited to, quartz, ceramics or metal. Similarly, the method of surface coating by PCS may also be used to remove PCS from the reactor/reaction by depositing the PCS on inert particles such as flowing particles of sand, for example.

In another aspect of the invention, a non-equilibrium plasma is employed as an electrode on the $(C_3O_2)_n$ production side of a fuel element, and steam is utilized on the other side of the fuel element. Non-equilibrium plasma may be low-temperature plasma. Low-temperature plasma is recognized in the art. See e.g. "The Technical and Economic Feasibility of Using Low-Temperature Plasma to Treat Gaseous Emissions from Pulp Mills and Wood Products Plants", John B. L. Harkness and Alexander A. Fridman, NCASI Technical Bulletin No. 795, September 1999. The non-thermal plasma discharge is similar to a dielectric barrier discharge in that it may be created at standard atmospheric pressure and does not require or create high temperatures at the treatment location. For example, during non-thermal plasma discharge, the typical temperature rise is only a few degrees. In non-thermal or low-temperature plasmas, usually the temperature of electrons is much higher (more than 10,000 K) than the temperature of heavy particles, such as ions and gas molecules. Typical low-temperature plasma exists in luminescent lamps. Gas temperature of the non-equilibrium plasma can by very different and range from room or ambient temperature to several thousand degrees Kelvin. Usually plasma is non-thermal when its gas temperature is not considerably higher than the surrounding temperature, which surrounding temperature may be, for example, room temperature (e.g. 20-25° C.). For the purposes of this invention, an average plasma gas temperature should preferably not exceed about 200° C.

The chemical reactions involved in this aspect of the invention can be described as follows:

Steam Side $$H_2O + 2e \rightarrow O^{2-} + H_2 \qquad (11)$$

Fuel element side with $(C_3O_2)$, production:

$$3C + O_2 - 2e \rightarrow (1/n)(C_3O_2)_n + 2O^+ \qquad (12)$$

$$2O^+ + O^{2-} \rightarrow 3/2 O_2 \qquad (13)$$

$$O_2 + e \leftarrow \rightarrow O + O^+ + 2e \text{ (in low-temperature plasma)} \qquad (14)$$

In this embodiment of the invention, the net electrochemical process can be exemplified as follows:

$$3C + 2H_2O \rightarrow (1/n)(C_3O_2)_n + 2H_2 \qquad (9)$$

Optionally, other reaction conditions can be controlled to favor the desired reaction(s) over other competing reactions that may occur in the reactor. For example, temperature, pressure, quantity of reactants, ratios of reactants, plasma properties, etc. can be controlled to favor the desired reaction(s), as discussed below.

In another aspect of the invention, a process is employed which involves the formation of an intermediate gaseous product on the $(C_3O_2)_n$ production side, before the step which results in formation of $(C_3O_2)_n$ is utilized. The following chemical reactions illustrate this process.

Atmosphere Side $$O_2 + 4e \rightarrow 2O^{2-} \qquad (15)$$

Fuel element side with $(C_3O_2)_n$ production:

$$3C + 2H_2O \rightarrow (1/n)(C_3O_2)_n + 2H_2 \qquad (16)$$

$$2H_2 - 4e \rightarrow 4H^+ \qquad (17)$$

$$4H^+ + 2O_2 \rightarrow 2H_2O \qquad (18)$$

In this aspect of the invention, the net electrochemical process may be exemplified by:

$$2C + 3O_2 \rightarrow (1/n)(C_3O_2)_n \qquad (5)$$

with $H_2O$ as an intermediate gaseous product. Optionally, other reaction conditions can be controlled to favor the desired reaction(s) over other competing reactions that may occur in the reactor. For example, temperature, pressure, quantity of reactants, ratios of reactants, etc. can be controlled to favor the desired reaction(s), as discussed below.

In still another aspect of the invention, a membrane with ion conductivity is used to produce both electricity and hydrogen gas. The production of both hydrogen gas and electricity from the reaction of carbon and water vapor utilizes a high temperature membrane, feeding carbon from one side of the membrane and water vapor from the other side. The water vapor is dissociated into hydrogen and oxygen gases allowing the oxygen gas to pass through the membrane, thereby allowing the oxygen to react with carbon. Subsequently, the hydrogen gas is separated. The reaction between carbon and oxygen may be assisted by the use of low-temperature plasma, thereby producing PCS. Efficient operation can be achieved when there is adequate contact between carbon and the membrane, and the reaction between carbon and oxygen is facilitated by the use of non-equilibrium plasma. Optionally, other reaction conditions can be controlled to favor the desired reaction(s) over other competing reactions that may occur in the reactor. For example, temperature, pressure, quantity of reactants, ratios of reactants, etc. can be controlled to favor the desired reaction(s), as discussed below.

In another aspect of the invention, pressure variation is utilized to suppress gaseous carbon oxide formation. For example, in most cases, gaseous carbon oxide formation can be reduced by increasing the pressure to which the reaction mixture is subjected. In this aspect of the invention, PCS production is promoted both by accelerating the desired PCS production reaction and by suppression of a competing reaction for the production of gaseous carbon oxides, using increased pressure. For example, under high pressure conditions the reaction:

$$2CH_4 + 3O_2 \rightarrow (1/n)(C_3O_2)_n + 2H_2O \qquad (4)$$

is accelerated, whereas the reaction:

$$CH_4 + 2O_2 \rightarrow CO_2 + 2H_2O \qquad (3)$$

is decelerated. Similarly, the reaction:

$$2C + 3O_2 \rightarrow (1/n)(C_3O_2)_n \qquad (5)$$

is accelerated, whereas the reaction:

$$C + O_2 \rightarrow CO_2 \qquad (6)$$

is decelerated.

Thus, by varying the pressure to a pressure at least above atmospheric pressure (1 atmosphere) the production of PCS is promoted while the production of carbon dioxide and/or water is suppressed. More preferably, the pressure can be increased to at least 1.5 atmospheres, or to at least 2.0 atmospheres. Hence, not only is there an increased PCS production, but also a significant reduction in the production of carbon dioxide is realized, which may benefit the environment.

In another aspect of the invention, PCS formation conditions are optimized to yield increased formation of PCS. For example, in another aspect of the invention, novel methods for feeding carbon to a reactor to increase PCS production are employed. One method for feeding carbon to a reactor includes natural gas ($CH_4$) or pulverized coal powder. Alternatively, coal slurry that continuously moves in a thin bed may be utilized. A gliding arc discharge moves around the surface of the coal slurry, creating a non-equilibrium condition. Thus, carbon suboxide is produced for use in the production of electricity and hydrogen gas.

Another way to increase PCS formation is to carry out supercritical oxidation of hydrocarbons in $H_2O$ and/or $CO_2$ may be utilized to process hydrocarbons. This process is exemplified by:

$$3C+2H_2O \rightarrow (1/n)(C_3O_2)_n+2H_2 \quad (9)$$

The supercritical reaction takes place in a closed, pressurized heated vessel with selective removal of hydrogen through a palladium or other hydrogen-transparent membrane to yield PCS, hydrogen and high temperature heat for steam generation in the production of electricity.

Partial oxidation of hydrocarbons may also be carried out under fuel-rich conditions (significant excess of fuel) as exemplified in the reactions:

$$2CH_4+3O_2 \rightarrow (1/n)(C_3O_2)_n+2H_2O \quad (4)$$

$$2C+3O_2 \rightarrow (1/n)(C_3O_2)_n \quad (5)$$

More specifically, in this aspect, plasma assisted super-rich combustion according to equation (4) is utilized. In this aspect, plasma supports combustion, while at the same time reducing or preventing soot formation.

In yet another aspect of the invention, plasma byproducts, such as ultraviolet emissions and electrons, are utilized in one or more of the foregoing processes as an optional additional means to stimulate the conversion of hydrocarbon to PCS. The plasma generated by using an arc discharge may produce ultraviolet emissions and/or electrons that can be used in a photo-catalytic reaction between carbon and water vapor.

In another aspect of the invention, a radiochemical oxidation as shown in equation (9) is accomplished on the boundary between coal and water in a strong ionized radiation field in the vicinity of a nuclear reactor.

In yet another aspect of the invention a photo catalytic oxidation based on the process as shown in equation (5) is accomplished on the boundary between catalyst, carbon and oxygen. Exothermic process (5) is kinetically limited, meaning that the reaction is extremely slow at low temperature conditions (for coal it runs days at 250° C.). It is well known that it is possible to accelerate reactions of this type using a catalyst. The catalyst may be additionally activated by light radiation, and this process is known as photo-catalytic oxidation. In another aspect of the invention, a plasma chemical oxidation, as shown in equation (9) is accomplished on the boundary between carbon and water plasma. Water plasma produced by electrical discharge (gliding arc, for example) is extremely chemically active and can accelerate the kinetically limited process (9). In yet another aspect of the invention, a sono-chemical oxidation as shown in equation (9) is accomplished on the boundary between carbon and water or in the process of equation (8) on the boundary between carbon, such as coal, and $CO_2$. Intensive ultrasound irradiation of liquids results in formation of very small cavitational bubbles with high temperature and pressure inside. Formation of such bubbles accelerates chemical processes that are kinetically limited. In another aspect of the invention, a process is employed where both PCS and hydrogen are produced simultaneously, for example, as follows:

$$2CH_4+CO_2 \rightarrow (1/n)(C_3O_2)_n+4H_2; \quad (7) \text{ or}$$

$$3C+2H_2O \rightarrow (1/n)(C_3O_2)_n+2H_2; \quad (9) \text{ or}$$

$$3CH_4+2H_2O \rightarrow (1/n)(C_3O_2)_n+8H_2 \quad (10)$$

Any of the foregoing methods for producing PCS and/or hydrogen from one or more of these processes can be employed. For example, one or both of the PCS and hydrogen can be removed from the reaction mixture during the reaction. Also, high pressure and/or temperature of at least above 25° C., more preferably from 80-250° C., and, most preferably, about 80-150° C. can be employed and/or different amounts of reactants or ratios of reactants can be employed to provide the desired products. In addition, plasma and/or plasma byproducts may be employed to drive the reaction to the desired products, PCS and hydrogen.

Alternatively, another aspect of the invention utilizes a process where hydrogen is produced as a product encapsulated in the PCS. This hydrogen-encapsulated PCS may subsequently be used as a means for hydrogen generation and/or storage. In this embodiment, the carbon suboxide polymer is produced in a form sufficiently porous to capture hydrogen molecules. One possible application of the carbon nano-tubes is hydrogen storage. Carbon nano-tubes are macromolecules of carbon. When partially oxidized, these tubes will become macromolecules of carbon suboxides. These carbon suboxide-based tubes have properties and dimensions similar to the carbon nano-tubes, and can be used for hydrogen storage. Thus, this form of PCS may provide a safe alternative means for the storage and transportation hydrogen gas. Such a porous PCS polymer may be utilized, for example, as a hydrogen-battery, which can be charged by compressing hydrogen gas using any compression means. During the discharge phase, the compressed hydrogen gas can be slowly and safely released from the porous polymers. When the hydrogen gas in the polymer is completely consumed, it can be exchanged with freshly charged hydrogen battery.

When PCS becomes a major byproduct of fossil hydrocarbon fuel combustion and/or transformation, as well as a byproduct of renewable hydrocarbon feedstock (e.g. forests, etc.) combustion and/or transformation, the production of PCS will be very significant. Thus, desirable useful applications for PCS will be needed to utilize this newly available product in large quantities. Alternatively, an aspect of the invention utilizes a method to return the PCS back to coal mines or some other storage space for long-term storage. One possible use after long-term storage is the production of more $CO_2$ for the creation of global warming in the future should the atmosphere of the Earth become too cool.

In another aspect of the invention, PCS is utilized as a component of an organic fertilizer following the addition of a bacteria culture that converts carbon suboxide to an organic compost. PCS may decompose to $C_3O_2$, which, in turn may react with water to form folic acid, a soluble organic substance. Thus, depolymerization yields a product that can be used as a fertilizer for agriculture. Additionally, folic acid or folate, is a B-vitamin that is an additive to some enriched foods and vitamin pills. PCS is naturally found in humic substances (the major organic components of soils), existing with an atomic ratio of carbon to oxygen about 1.5. Humic substances containing naturally occurring PCS, also contain other atoms such as H, N, S, metals and metal oxides, etc. Thus, humic substances are major, desirable by-products of hydrocarbon transformation during energy or hydrogen production from coal or other condensed hydrocarbons (oil, peat, shale oil, etc.), in which all these additive atoms (H, N, S, etc.)

necessary for agriculture are already present. This by-product may be used directly in agriculture.

In another aspect of the invention, PCS, which is a relatively inert substance, may be utilized as a construction material by forming a pure plastic polymer, or forming a composite material. For example, there is good adhesion between PCS molecules and carbon fibers and nano-fibers. That is why PCS may be utilized in carbon-carbon suboxide composites.

In another aspect of the invention, PCS is utilized to produce carbon rich fibers by heating PCS in vacuum or in any non-oxidative atmosphere thereby driving out oxygen to obtain a carbon rich fiber substance.

It is known that carbon nano-tubes are good storage for hydrogen [A. C. Dillon, et al., "Hydrogen Storage in Carbon Single-Wall Nanotubes", Proceedings of the 2002 U.S. DOE Hydrogen Program Review, NREL/CP-610-32405]. PCS has similar properties and thus may be employed for hydrogen storage as well.

What is claimed is:

1. A method for the production of carbon suboxide or polymeric carbon suboxide, comprising:
    reacting an organic substance or carbon with water, oxygen, or carbon dioxide at an elevated temperature or pressure, or both, to produce carbon suboxide.

2. The method of claim 1, wherein the elevated temperature and pressure corresponds to supercritical conditions.

3. The method of claim 1, wherein the organic substance is natural gas, methane, pulverized coal powder, a coal slurry, peat, or biomass, or any combination thereof.

4. The method of claim 1, further comprising producing hydrogen.

5. The method of claim 4, wherein the hydrogen is selectively removed.

6. The method of claim 5, wherein the hydrogen is selectively removed through the use of a fuel cell which consumes hydrogen, or a hydrogen-transparent membrane.

7. The method of claim 6, wherein the fuel cell contains solid oxide or another type of membrane transparent for oxygen ions.

8. The method of claim 6, wherein consumption of hydrogen in a fuel cell results in electricity production.

9. The method of claim 4, further comprising storing hydrogen in the polymeric carbon suboxide.

10. The method of claim 9, wherein the membrane separates a reaction zone where partial oxidation of the organic substance takes place and a volume that contains gaseous oxygen.

11. The method of claim 1, wherein the polymeric carbon suboxide is a humic acid or humus.

12. The method of claim 1, wherein the polymeric carbon suboxide is in the form of nano-tubes.

13. Carbon suboxide or polymers of carbon suboxide made according to the method of claim 1.

14. Humic acid made according to the process of claim 1.

15. The method of using polymeric carbon suboxides made according to the process of claim 1 as an organic fertilizer or soil conditioner.

16. The method of carbon dioxide sequestration by bonding of carbon in polymeric carbon suboxides made according to the process of claim 1.

17. The method of carbon dioxide storage by bonding of carbon in polymeric carbon suboxides made according to the process of claim 1.

18. A method for producing fibers, comprising:
    reacting at least one material selected from carbon or a hydrocarbon with a compound selected from the group consisting of oxygen and water in the presence of non-equilibrium plasma or elevated temperature, or pressure, or any combination of these three parameters, to produce polymeric carbon suboxide; and
    heating the polymeric carbon suboxide in the absence of oxygen to drive out at least some oxygen from the polymeric carbon suboxide to produce carbon rich fibers.

19. The method of claim 18, wherein the method is carried out in a vacuum or non-oxidative atmosphere.

20. The method of claim 18, wherein the carbon rich fibers are carbon nano-tubes.

21. The method of claim 18, wherein reacting at least one material selected from carbon or a hydrocarbon further produces hydrogen.

22. The method of claim 21, further comprising removing hydrogen from the carbon rich fibers.

23. Fibers made according to the process of claim 18.

24. A method for the production of carbon suboxide or polymers of carbon suboxide comprising the steps of:
    reacting carbon or hydrocarbon with oxygen or water in the presence of nonequilibrium plasma to produce at least carbon suboxide and hydrogen.

25. The method of claim 24, where the nonequilibrium plasma is low temperature plasma.

26. The method of claim 24, wherein said water is in the form of steam.

27. The method of claim 24, wherein the hydrogen is removed from the reaction mixture by conducting the reaction in the presence of membranes transparent for hydrogen or by using high temperature membranes with high oxygen conductivity.

28. The method of claim 24, wherein the reaction is carried out at a pressure greater than atmospheric pressure or a pressure greater than 1.5 atmospheres.

29. The method of claim 24, wherein the reaction is carried out a temperature greater than 25° C. or a temperature greater than 80° C.

30. A method of electricity production from an organic substance or carbon, comprising the steps of:
    converting the organic substance or carbon into a condensed product by reacting the organic substance or carbon with water, oxygen, or carbon dioxide at an elevated temperature or pressure, or both, to produce carbon suboxide; and
    oxidizing hydrogen in a fuel cell.

31. The method of claim 30, wherein the water or carbon dioxide is at an elevated temperature, pressure, or both.

32. The method of claim 31, wherein the temperature and pressure correspond to the supercritical conditions.

33. The method of claim 31, wherein the elevated temperature is supported at least partially by heat generated from the oxidizing hydrogen in the fuel cell.

34. The method of claim 30, wherein the method is performed at least partially in a reactor.

* * * * *